United States Patent
Jin et al.

(10) Patent No.: US 8,340,571 B2
(45) Date of Patent: Dec. 25, 2012

(54) REPEATER EQUIPPED WITH ATTENUATOR AND VARIABLE ATTENUATION METHOD IN THE REPEATER AND SYSTEM FOR REMOTELY MANAGING THE SAME

(75) Inventors: Yang-Kyu Jin, Namyangjoo-shi (KR); Jae-Kon Kim, Seoul (KR); Yong-Won Choi, Seoul (KR)

(73) Assignee: KT Corporation, Gyeonggi-do (KR)

( * ) Notice: Subject to any disclaimer, the term of this patent is extended or adjusted under 35 U.S.C. 154(b) by 486 days.

(21) Appl. No.: 12/593,590

(22) PCT Filed: May 21, 2008

(86) PCT No.: PCT/KR2008/002826
§ 371 (c)(1),
(2), (4) Date: Sep. 28, 2009

(87) PCT Pub. No.: WO2008/143456
PCT Pub. Date: Nov. 27, 2008

(65) Prior Publication Data
US 2010/0120356 A1      May 13, 2010

(30) Foreign Application Priority Data
May 21, 2007   (KR) ......................... 10-2007-0049186

(51) Int. Cl.
*H04B 3/36* (2006.01)
(52) U.S. Cl. ................ 455/7; 455/9; 370/315; 375/211
(58) Field of Classification Search ............. 455/7–11.1, 455/14–25; 370/315; 375/211, 213
See application file for complete search history.

(56) References Cited

U.S. PATENT DOCUMENTS

| 5,687,195 | A | 11/1997 | Hwang et al. |
| 6,690,915 | B1 * | 2/2004 | Ito et al. ......................... 455/7 |

FOREIGN PATENT DOCUMENTS

| JP | 10-313271 A | 11/1998 |
| JP | 11-112400 A | 4/1999 |
| JP | 2000-506340 A | 5/2000 |
| JP | 2001-069091 A | 3/2001 |

(Continued)

OTHER PUBLICATIONS

International Search Report Dated Sep. 29, 2008 of Parent Application PCT/KR2008/002826, 3 pages. Written Opinion Dated Sep. 29, 2008 of Parent Application PCT/KR2008/002826, 3 pages.

*Primary Examiner* — Raymond Dean
(74) *Attorney, Agent, or Firm* — IP Legal Services, LLC

(57) ABSTRACT

A repeater, a remote management system of a repeater and a method are provided for variably attenuating an input signal. A repeater relays at least one frequency band signal between a base station and a service side, includes at least one variable attenuator for variably attenuating each of at least one frequency band signal, variably attenuates an input signal that is received from the base station through the variable attenuator, and transfers the input signal to the service side. Further, a remote management system of the repeater communicates through the repeater and a mobile communication network and includes a repeater management server for requesting to change an attenuation value of the variable attenuator to the repeater when the input signal is an excess input signal.

19 Claims, 3 Drawing Sheets

FOREIGN PATENT DOCUMENTS

| | | |
|---|---|---|
| JP | 2001-156562 A | 6/2001 |
| JP | 2002-094408 A | 3/2002 |
| KR | 10-0133338 B1 | 12/1997 |
| KR | 10-0316685 B1 | 12/2001 |
| KR | 20-0306599 Y1 | 3/2003 |
| KR | 10-2004-0108288 A | 12/2004 |
| KR | 2004108288 A * | 12/2004 |
| KR | 10-2007-0012704 A | 1/2007 |
| WO | 97/33381 A | 9/1997 |

* cited by examiner

FIG. 2
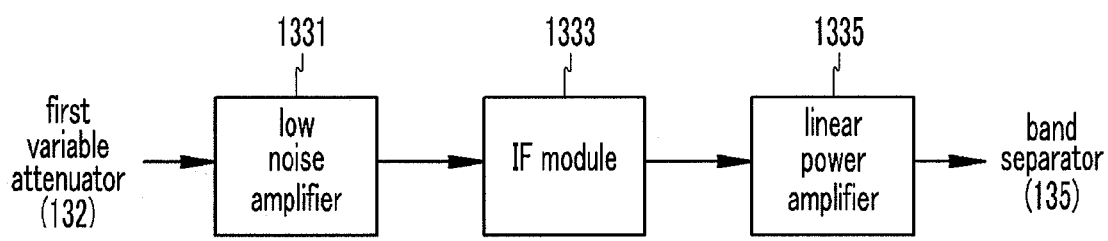
[FIG. 3]
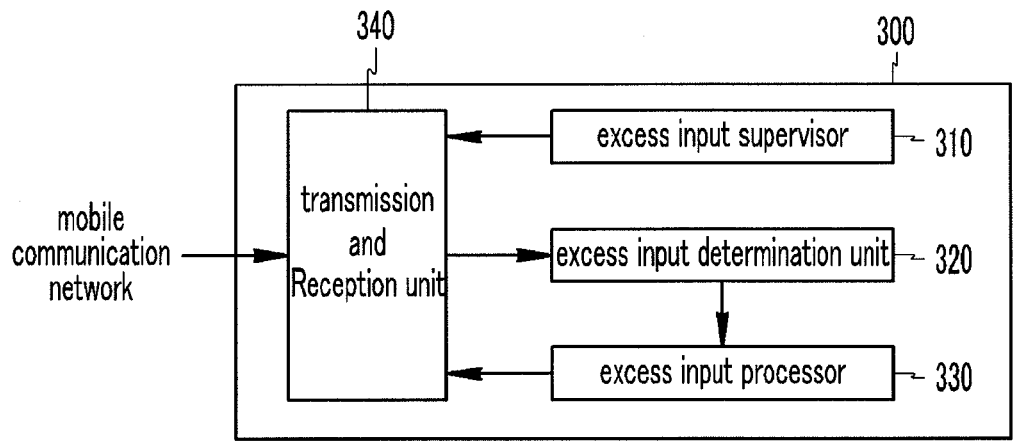

REPEATER EQUIPPED WITH ATTENUATOR AND VARIABLE ATTENUATION METHOD IN THE REPEATER AND SYSTEM FOR REMOTELY MANAGING THE SAME

TECHNICAL FIELD

The present invention relates to a repeater having an attenuator and a method and a system for remotely managing the same. More particularly, the present invention relates to an attenuator for attenuating input signal intensity of a repeater and a remote management method and system for remotely controlling the same.

BACKGROUND ART

A repeater is a device that receives a signal of a base station and relays the signal to a mobile communication terminal, and that is used for extending coverage in a mobile communication system. In general, the repeater receives a weak signal that is transmitted from a base station through a link antenna, amplifies the received signal, and then transmits the signal to a mobile communication terminal through a service antenna.

Nowadays, a multi band repeater that receives and relays a signal having a plurality of different frequency bands has been developed and used in the location. For example, because a dual band repeater that can simultaneously cover two bands of a code division multiple access (CDMA) system and a wideband code division multiple access (WCDMA) system shares some of parts of the CDMA repeater and the WCDMA repeater within a single equipment, a manufacturing cost is lowered and installation space is minimized.

When intensity of an input signal that is received from the base station and that is input to the repeater is greater than that of a predetermined level, because a burden is imposed on an operation of the repeater, the input signal should be lowered to an appropriate level or less. Accordingly, conventionally, by additionally providing an attenuator at the outside of the repeater, the attenuator adjusts an input signal that is received from the base station to an appropriate level and then inputs the input signal to the repeater. However, in general, because an external attenuator that is used in the repeater has a fixed attenuation value, according to the change of input signal intensity and installation environment of the repeater, in order to apply a changed attenuation value, a location operator should directly visit a location at which the repeater is installed and adjust an attenuation value. Therefore, there is a problem that much time and cost are required in maintenance of the repeater.

Further, in a multi band repeater, because intensity of an input signal that is received according to each band is different, a plurality of attenuators for attenuating each intensity of a signal that is excessively input on a band basis is required.

Further, because the multi band repeater has different propagation loss on a band basis, when the multi band repeater shares a feeder for a link antenna, an excess input state or a low input state may be formed on a frequency band basis, whereby in the multi band repeater, there is a problem that it is difficult to share a feeder of the link antenna.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a repeater having an attenuator having advantages of adjusting an attenuation value according to propagation characteristics of each band input signal.

The present invention has been made in an effort to further provide a repeater having advantages of sharing a feeder of a link antenna even in a multi-band repeater and thus reducing an equipment investment cost.

The present invention has been made in an effort to further provide a remote management method and system having advantages of reducing a cost and a time for maintenance of a repeater by remotely adjusting an attenuation value of an attenuator of the repeater without directly going out to the location.

Technical Solution

An exemplary embodiment of the present invention provides a repeater that relays a signal between a base station and a service side, including: a forward direction signal processor that performs an amplifying and filtering processing of an input signal that is received from the base station and that outputs the signal; a backward direction signal processor that performs an amplifying and filtering processing of an input signal that is received from the service side and that outputs the signal; a variable attenuator that attenuates an input signal that is received from the base station and that outputs the input signal to the forward direction signal processor according to an attenuation value that is set by an external input value a preset attenuation value; a repeater controller that manages internal setting data of the forward direction signal processor and the backward direction signal processor and that controls an attenuation value of the variable attenuator; and a repeater supervisor that receives an attenuation value change request of the variable attenuator from the outside and that transmits the attenuation value change request to the repeater controller.

Another embodiment of the present invention provides a method of variably attenuating a repeater that relays a signal between a base station and a service side, including; receiving, when an input signal that is received from the base station is determined as an excess input signal, an attenuation value of a transmitted input signal; and attenuating and outputting the input signal according to the received attenuation value.

Yet another embodiment of the present invention provides a remote management system of a repeater, including: a repeater that relays at least one frequency band signal between a base station and a service side, and that includes at least one variable attenuator that variably attenuates each of the at least one frequency band signal, and that variably attenuates an input signal that is received from the base station through the variable attenuator, and that transfers the input signal to the service side; and a repeater management server that communicates through the repeater and a mobile communication network, and that requests, when the input signal is an excess input signal, to change an attenuation value of the variable attenuator to the repeater.

BRIEF DESCRIPTION OF THE DRAWINGS

FIG. 2 is a block diagram of a first forward direction signal processor that is shown in FIG. 1.

FIG. 3 is a block diagram of a repeater management server that is shown in FIG. 1.

BEST MODE

Figure 1:
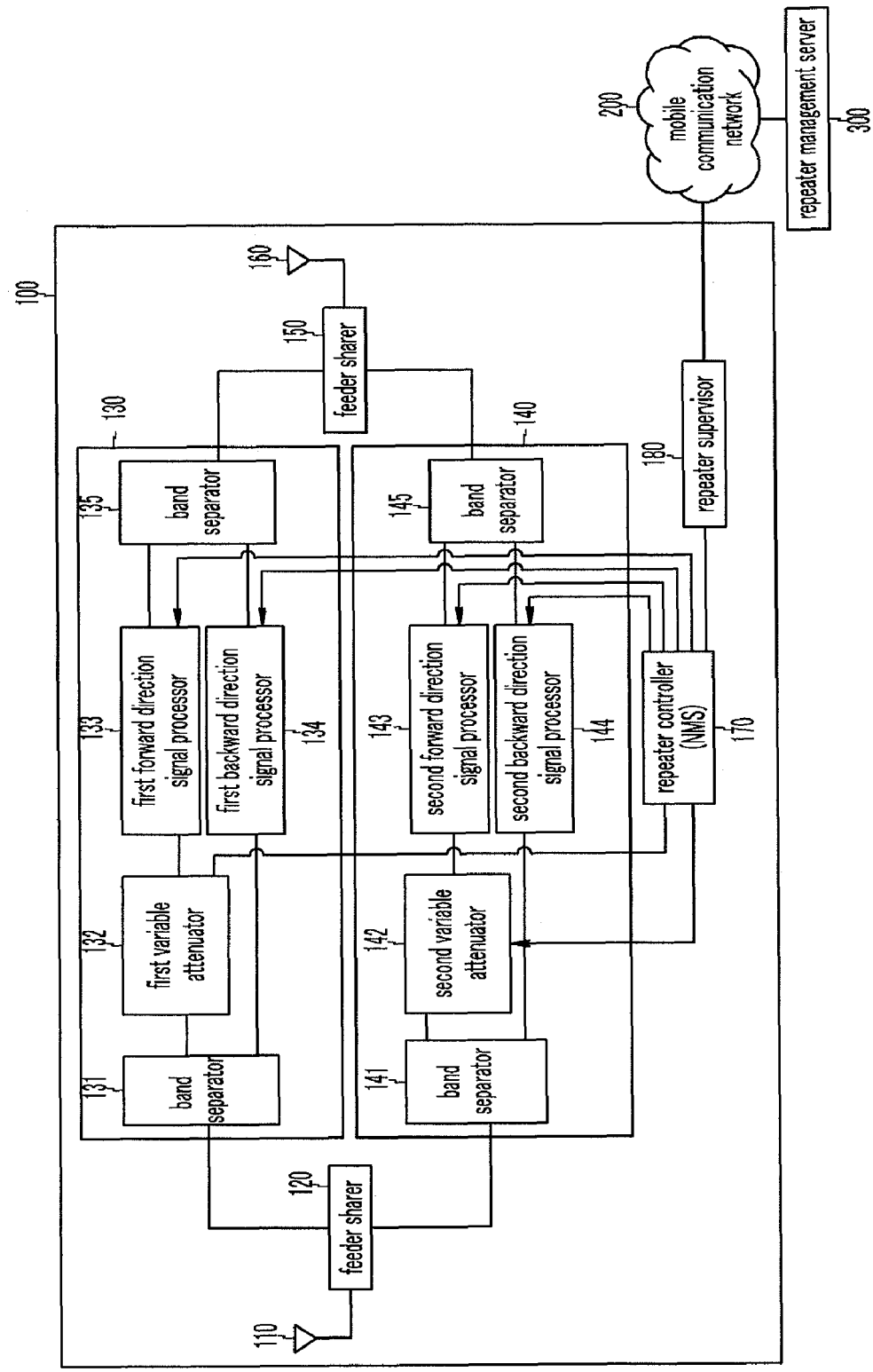
FIG. 1 is a diagram illustrating a repeater and a remote management system thereof according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise", and variations such as "comprises" and "comprising", will be understood to imply the inclusion of stated elements but not the exclusion of any other elements. Further, terms such as "unit", "device", "module", and "block" that are described in the specification indicate a unit for processing at least one function or operation and may be embodied with hardware, software, or a combination of hardware and software.

A repeater having an attenuator and a method and a system for remotely managing the same according to an exemplary embodiment of the present invention are described hereinafter in detail.

FIG. 1 is a diagram illustrating a repeater and a remote management system thereof according to an exemplary embodiment of the present invention.

As shown in FIG. 1, a repeater 100 according to an exemplary embodiment of the present invention includes a link antenna 110, feeder sharers 120 and 150, a first signal processor 130, a second signal processor 140, a service antenna 160, a repeater controller 170, and a repeater supervisor 180. In this case, in an exemplary embodiment of the present invention, the repeater controller 170 is a network management system (hereinafter, referred to as an 'NMS').

A remote management system according to an exemplary embodiment of the present invention includes a repeater 100, a mobile communication network 200, and a repeater management server 300.

First, the repeater 100 having an attenuator according to an exemplary embodiment of the present invention will now be described.

Specifically, the feeder sharer 120 according to an exemplary embodiment of the present invention separates a radio frequency (RF) signal of two bands (a CDMA band and a WCDMA band in an exemplary embodiment of the present invention) that are received from a base station through the link antenna 110 and outputs each band signal to the first signal processor 130 and the second signal processor 140. In this case, preferably, the first signal processor 130 processes a CDMA band signal and the second signal processor 140 processes a WCDMA band signal. Further, the feeder sharer 120 combines RF signals of two bands in which each signal is processed through the first and second signal processors 130 and 140 and outputs the RF signal as a dual band RF signal to the link antenna 110.

The feeder sharer 150 combines RF signals of two bands in which each signal is processed through the first and second signal processors 130 and 140 and outputs the RF signal as a dual band RF signal to the service antenna 160. Further, the feeder sharer 150 separates RF signals of two bands that are received from a service side (e.g., a mobile communication terminal) through the service antenna 160 and outputs each of the RF signals to the first signal processor 130 and the second signal processor 140.

The first signal processor 130 of the repeater 100 receives an RF signal of the CDMA band through the link antenna 110 and the feeder sharer 120 and performs an amplification and filtering processing. The first signal processor 130 outputs the RF signal in which an amplification and filtering processing is performed to the feeder sharer 150. Further, the first signal processor 130 performs an amplification and filtering processing of the RF signal that is received from the service side and outputs the RF signal to the feeder sharer 120.

The first signal processor 130 includes a band separator 131, a first variable attenuator 132, a first forward direction signal processor 133, a first backward direction signal processor 134, and a band separator 135.

The band separators 131 and 135 separate a processing path that outputs an RF signal that is input from a base station through the link antenna 110 to a service side through the service antenna 160 and a processing path that outputs an RF signal that is input from the service side through the service antenna 160 to the base station through the link antenna 110.

Referring to FIG. 2, the first forward direction signal processor 133 includes a low noise amplifier (hereinafter, referred to as an 'LNA') 1331, an intermediate frequency (IF) module 1333, and a linear power amplifier (hereinafter, referred to as an 'LPA') 1335.

In this case, the LNA 1331 of the first forward direction signal processor 133 minimizes and amplifies noise of an RF signal of a CDMA band that is received from the base station, specifically an RF signal that is output from the first variable attenuator 132. The IF module 1333 adjusts a gain of an RF signal that is amplified through the LNA 1331, down-converts a frequency thereof, converts the frequency to an intermediate frequency, filters the frequency, up-converts again the frequency, and amplifies the frequency, thereby forming in identical signals and outputting the signals. The LPA 1335 lineally amplifies power of a signal that is output from the IF module 1333 and outputs the signal to the band separator 135.

The first backward direction signal processor 134 also includes an LNA module, an IF module, and an LPA module. In this case, the order of a signal processing of the first backward direction signal processor 134 is opposite to that of the first forward direction signal processor 133 that is described above. That is, the LNA module of the first backward direction signal processor 134 minimizes and amplifies noise of an RF signal of the CDMA band that is received from the service side. The IF module adjusts a gain of an RF signal that is amplified through the LNA, down-converts a frequency thereof, converts the frequency to an intermediate frequency, filters the frequency, up-converts again the frequency, and amplifies the frequency, thereby forming identical signals and outputting the signals. The LPA module lineally amplifies power of a signal that is output from the IF module and outputs the signal to the band separator 131.

The first variable attenuator 132 is positioned between the band separator 131 and the first forward direction signal processor 133, is an attenuator having a varying attenuation value under the control of the repeater controller 170, and attenuates intensity of an RF signal by applying an attenuation value to an RF signal that is received from the base station.

Conventionally, when a level of a signal that is processed in the repeater 100 increases, in order to adjust the increased level of the signal, a signal that is output from the LNA 1331 of the first forward direction signal processor 133 may be attenuated. However, an attenuation operation can be performed only when an input signal that is allowed in the LNA 1331 is input, and when a signal having a level greater than a level of an input signal that is allowed in the LNA 1331 is input to the repeater 100 through the antenna 110, there is a problem that the LNA 1331 does not operate and thus the repeater 100 does not normally operate. However, in an exemplary embodiment of the present invention, because the first variable attenuator 132 is positioned at a front end of the first forward direction signal processor 133 including the LNA 1331, even if a signal of a level greater than that of an input signal that is allowed in the LNA 1331 is input to the repeater 100, because the signal is attenuated by the first variable attenuator 132 and is input to the LNA 1331 of the first forward direction processor 133, the repeater 100 can be smoothly operated.

The second signal processor 140 of the repeater 100 receives an RF signal of a WCDMA band through the link antenna 110 and the feeder sharer 120 and performs an amplification and filtering processing of the signal. The second signal processor 140 outputs an RF signal in which an amplification and filtering processing is performed to the feeder sharer 150. Further, the second signal processor 140 performs an amplification and filtering processing of the RF signal that is received from the service side and outputs the signal to the feeder sharer 120.

The second signal processor 140 includes a band separator 141, a second variable attenuator 142, a second forward direction signal processor 143, a second backward direction signal processor 144, and a band separator 145. In this case, each of the constituent elements of the second signal processor 140 performs the same function as each of the constituent elements of the first signal processor 130 that is described above, except that the processed signal is an RF signal of a WCDMA band, and therefore a detailed description thereof is omitted.

The repeater controller 170 manages internal setting data of the repeater 100 and controls the first and second signal processors 130 and 140. In this case, the internal setting data of the repeater 100 that is managed by the repeater controller 170 includes reference input signal intensity, reference output signal intensity, a gain value, an attenuation value of the first variable attenuator 132, and an attenuation value of the second variable attenuator 142.

Further, the repeater controller 170 receives an excess input determination information request from the repeater supervisor 180 and transmits excess input determination information including current output signal intensity, a gain value, and reference input signal intensity information that are output from the repeater 100 to the repeater supervisor 180. Here, the current output signal intensity of the repeater 100 indicates each RF signal intensity that is output through the first and second forward direction signal processors 133 and 143.

The repeater controller 170 receives an attenuation value change request of the first variable attenuator 132 or the second variable attenuator 142 from the repeater supervisor 180 and changes an attenuation value of the first variable attenuator 132 or the second variable attenuator 142 that is set in the internal setting data to an attenuation value in which a change request is received. The repeater controller 170 controls the first variable attenuator 132 or the second variable attenuator 142 to change the attenuation value of the first variable attenuator 132 or the second variable attenuator 142 to the attenuation value in which a change request is received.

The repeater supervisor 180 receives an excess input determination information request of the repeater 100 through a character message such as wireless data or a short message service (SMS) from the repeater management server 300 that is positioned at a remote place separately from the repeater 100 and requests excess input determination information to the repeater controller 170. The repeater supervisor 180 receives excess input determination information from the repeater controller 170 and transmits the excess input determination information to the repeater management server 300 through wireless data or a character message. For example, the repeater supervisor 180 converts excess input determination information that is received from the repeater controller 170 to a packet form of wireless data including an SMS and transmits the wireless data to the repeater management server 300.

Next, a system for remotely managing the first variable attenuator 132 and the second variable attenuator 142 of the repeater 100 will be described. A remote management system of the repeater 100 according to an exemplary embodiment of the present invention includes a repeater 100, a mobile communication network 200, and a repeater management server 300.

When two band input signals that are transferred from the base station to the repeater 100 are an excess input signal having signal intensity exceeding a preset appropriate level, the repeater management server 300 controls the change of an attenuation value of the first variable attenuator 132 or the second variable attenuator 142 of the repeater 100 and allows a level of an excess input signal to be reference input signal intensity or less.

In order for the repeater management server 300 to remotely control an attenuation value of the first and second attenuators 132 and 142 of the repeater 100, the repeater management server 300 or the repeater 100 performs wireless communication through the mobile communication network 200. That is, the repeater 100 and the repeater management server 300 transmit and receive information through wireless data or a character message. In this case, in order to transmit and receive information using a character message between the repeater 100 and the repeater management server 300, a remote management system may further include a server, for example a short message service center (SMSC) for transmitting a character message between the mobile communication network 200 and the repeater management server 300.

Next, a remote management system according to an exemplary embodiment of the present invention is described in detail with reference to FIG. 3.

FIG. 3 is a block diagram of the repeater management server 300 that is shown in FIG. 1.

As shown in FIG. 3, the repeater management server 300 includes an excess input supervisor 310, an excess input determination unit 320, an excess input processor 330, and a transmission and reception unit 340.

The excess input supervisor 310 requests excess input determination information to the repeater supervisor 180 of the repeater 100 through the transmission and reception unit 340. In this case, the excess input supervisor 310 receives a request of an operator of the repeater management server 300 to request excess input determination information to the repeater supervisor 180 or to periodically request excess input determination information to the repeater supervisor 180.

The excess input determination unit 320 receives and analyzes excess input determination information from the repeater supervisor 180 through the transmission and reception unit 340 and calculates current input signal intensity of the repeater 100. In an exemplary embodiment of the present invention, the excess input determination unit 320 calculates current input signal intensity of each band using current output signal intensity and a gain value of each of the two bands CDMA and WCDMA that are used in the repeater 100 in the received excess input determination information.

The excess input determination unit 320 compares the calculated current input signal intensity and reference input signal intensity of each band and determines whether the current input is excess input. The excess input determination unit 320 transmits the determined result to the excess input processor 330.

The excess input processor 330 checks the received excess input determination result and calculates an attenuation value to be changed for the first variable attenuator 132 and/or the second variable attenuator 142 of the repeater 100 corresponding to a band that is determined to an excess input signal. For example, when an input signal of a CDMA band is an excess input signal, the excess input processor 330 calculates an attenuation value of the first variable attenuator 132 so that intensity of a current input signal becomes intensity of a reference input signal. The excess input processor 300 transmits an attenuation value change request including the calculated attenuation value to the repeater supervisor 180 through the transmission and reception unit 340.

The transmission and reception unit 340 transmits an excess input determination information request to the repeater supervisor 180 through the mobile communication network 200 and receives excess input determination information in wireless data through the mobile communication network 200 from the repeater supervisor 180 in response to the request.

Figure 4:
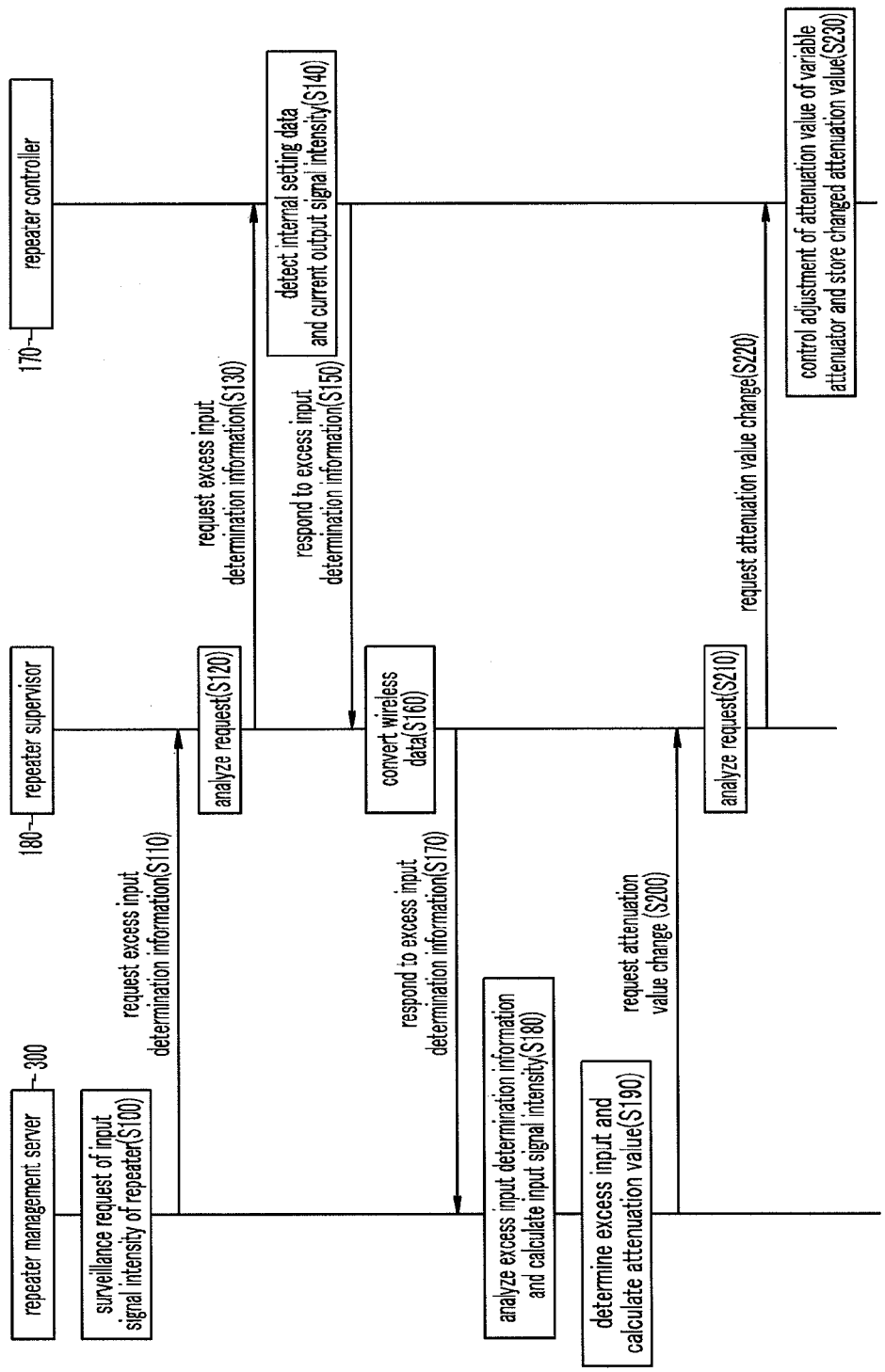
FIG. 4 is a data flowchart illustrating a method of variably attenuating a repeater according to an exemplary embodiment of the present invention.

Next, a method of variably attenuating the repeater 100 according to an exemplary embodiment of the present invention is described in detail with reference to FIG. 4.

First, the repeater management server 300 receives a surveillance request of input signal intensity of the repeater according to an operator or a preset period (S100) and requests excess input determination information to the repeater supervisor 180 through the mobile communication network 200 (S110). In this case, a time point that receives a surveillance request may be a time point that receives a request of an operator of the repeater management server 300, and the repeater management server 300 may voluntarily periodically request the time point.

The repeater supervisor 180, having received an excess input determination information request from the repeater management server 300 analyzes an excess input determination information request (S120) and requests current output signal intensity, a gain value, and reference input signal intensity information to the repeater controller 170 (S130).

Thereafter, the repeater controller 170 detects internal setting data and current output signal intensity (S140) and transmits the internal setting data and current output signal intensity including excess input determination information to the repeater supervisor 180 (S150).

Next, the repeater supervisor 180 converts the received excess input determination information to a packet form of wireless data (S160) and transmits the wireless data form of excess input determination information to the repeater management server 300 through the mobile communication network 200 (S170).

Thereafter, the repeater management server 300 analyzes the received excess input determination information and calculates current input signal intensity of the repeater 100 (S180). In this case, the current input signal intensity may be calculated using current output signal intensity and a gain value that are included in the excess input determination information and calculates input signal intensity of each signal of the two bands CDMA and WCDMA.

Thereafter, the repeater management server 300 determines whether a signal that is currently input to the repeater 100 is an excess input signal using the calculated input signal intensity and calculates, if a signal that is currently input to the repeater 100 is an excess input signal, an attenuation value to be changed in order to attenuate a level of the excess input signal (S190). In this case, the repeater management server 300 compares reference input signal intensity that is included in the received excess input determination information with the calculated input signal intensity, and when the calculated input signal intensity exceeds the reference input signal intensity, the repeater management server 300 determines a current signal that is input to the repeater 100 as an excess input signal. The repeater management server 300 calculates a change attenuation value to allow the current input signal intensity to be in a level of the reference input signal intensity. Here, the change attenuation value is designated to a change attenuation value of a variable attenuator (i.e., the first variable attenuator 132 and/or the second variable attenuator 142) of a band that is determined as excess input among the calculated input signals of two bands.

Thereafter, the repeater management server 300 transmits an attenuation value change request including the calculated change attenuation value to the repeater supervisor 180 through the mobile communication network 200 (S200). In this case, the attenuation value change request includes an attenuation value to be changed of the first variable attenuator 132 or the second variable attenuator 142 of the repeater 100 and includes, when both signal intensities of two bands that have been input to the repeater 100 are excess input, a change attenuation value of both the first variable attenuator 132 and the second variable attenuator 142.

The repeater supervisor 180, having received the attenuation value change request analyzes this request (S210) and requests the change of an attenuation value of the first variable attenuator 132 or the second variable attenuator 142 to the repeater controller 170 (S220).

Thereafter, the repeater controller 170 controls to change a preset attenuation value of the first variable attenuator or the second variable attenuator to an attenuation value in which the change is requested and stores the changed attenuation value in internal setting data (S230).

In this case, in FIG. 3, it is described that the repeater management server 300 requests excess input determination information to the repeater supervisor 180, however in another exemplary embodiment, the repeater supervisor 180 may voluntarily periodically transmit excess input determination information of the repeater 100 to the repeater management server 300. That is, in FIG. 4, steps S100 to S130 may be replaced with a step in which the repeater supervisor 180 voluntarily periodically requests excess input determination information to the repeater controller 170.

In an exemplary embodiment of the present invention, it is described that the repeater 100 is a dual band repeater including the first signal processor 130 that processes a signal of a CDMA band and the second signal processor 140 that processes a signal of a WCDMA band. However, as in an exemplary embodiment of the present invention, a repeater that processes a band signal or a multi band repeater that processes a signal of at least three bands as well as a dual band repeater also have an attenuator in an input terminal thereof, and can be applied to a remote management system of the attenuator.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

[Industrial Applicability]

According to the present invention, by providing an attenuator for remotely controlling an attenuation value within a repeater, when an excess input signal is received in the repeater, an input signal level of the repeater can be remotely adjusted.

Further, thereby, because an input signal level of the repeater can be managed without directly going out to the location, a maintenance cost of the repeater can be reduced.

Further, in a multi band repeater, a feeder of a link antenna can be shared and thus an equipment investment cost can be reduced.

The invention claimed is:

1. A repeater that relays a signal between a base station and a service side comprising:
   a variable attenuator that attenuates an input signal that is received from the base station according to a predetermined attenuation value;
   a forward direction signal processor that performs an amplifying and filtering processing and outputs an output signal of the variable attenuator;
   a repeater controller that detects output signal intensity of the forward direction signal processor and that controls an attenuation value of the variable attenuator; and
   a repeater supervisor that transmits output signal intensity that is detected by the repeater controller to a management server, and that receives an attenuation value change request, which includes an attenuation value to be changed, from the management server, and that transfers the attenuation value change request to the repeater controller,
   wherein the repeater controller changes an attenuation value of the variable attenuator according to an attenuation value that is transferred from the management server through the repeater supervisor.

2. The repeater of claim 1, wherein the forward direction signal processor comprises:
   a low noise amplifier that amplifies a signal that is output from the variable attenuator;
   an intermediate frequency (IF) module that converts a signal that is amplified in the low noise amplifier to an intermediate frequency signal; and
   a power amplifier that amplifies power of a signal that is converted by the IF module.

3. The repeater of claim 2, wherein the repeater controller receives a request of excess input determination information that is used for determining whether an input signal that is input from the management server through the repeater supervisor is an excess input signal, collects the excess input determination information, and transmits the excess input determination information to the management server through the repeater supervisor.

4. The repeater of claim 3, wherein the excess input determination information comprises reference input signal intensity of the repeater, output signal intensity that is detected by the repeater controller, and a gain value of the forward direction signal processor.

5. The repeater of claim 3, wherein the repeater supervisor periodically requests transmission of the excess input determination information to the repeater controller according to a periodic request of the management server, receives excess input determination information that is transmitted from the repeater controller, and periodically transfers the excess input determination information to the management server.

6. The repeater of claim 3, wherein the attenuation value change request is received from the management server when it is determined that the management server changes an attenuation value of the variable attenuator based on the excess input determination information.

7. A repeater that relays each of at least two frequency band signals between a base station and a service side, comprising:
   a feeder sharer that distributes at least two frequency band signals that are received from the base station according to each frequency band;
   a plurality of variable attenuators, each attenuating a signal that is output from the feeder sharer according to a predetermined attenuation value;
   a plurality of forward direction signal processors, each performing an amplifying and filtering processing and outputting an output signal of each of the plurality of variable attenuators;
   a repeater controller that detects output signal intensity of each of the plurality of forward direction signal processors and that controls an attenuation value of each of the plurality of variable attenuators; and
   a repeater supervisor that transmits each output signal intensity that is detected by the repeater controller to a management server, and that receives an attenuation value change request, which includes an attenuation value to be changed, from the management server, and that transfers the attenuation value change request to the repeater controller,
   wherein the repeater controller changes an attenuation value of each of the plurality of variable attenuators according to an attenuation value that is transferred from the management server through the repeater supervisor.

8. The repeater of claim 7, wherein each of the plurality of forward direction signal processors comprises:
   a low noise amplifier that amplifies a signal that is output from the plurality of variable attenuators;
   an IF module that converts a signal that is amplified in the low noise amplifier to an intermediate frequency signal; and
   a power amplifier that amplifies power of a signal that is converted by the IF module.

9. The repeater of claim 8, wherein the repeater controller receives a request of excess input determination information that is used for determining whether each frequency band signal that is input from the management server to the repeater through the repeater supervisor is an excess input signal, collects the excess input determination information, and transmits the excess input determination information to the management server through the repeater supervisor.

10. The repeater of claim 9, wherein the excess input determination information comprises reference input signal intensity of the repeater, each output signal intensity that is detected by the repeater controller, and a gain value of each of the plurality of forward direction signal processors.

11. The repeater of claim 9, wherein the repeater supervisor periodically requests transmission of the excess input determination information to the repeater controller according to a periodic request of the management server, receives excess input determination information that is transmitted from the repeater controller, and periodically transfers the excess input determination information to the management server.

12. The repeater of claim 9, wherein the attenuation value change request is received from the management server when it is determined that the management server changes an attenuation value of the variable attenuator based on the excess input determination information.

13. A method of variably attenuating a repeater that relays a signal between a base station and a service side, comprising:
  receiving a request of excess input determination information for determining whether an input signal that is received from the base station is an excess input signal from a management server;
  detecting the excess input determination information and transmitting the excess input determination information to the management server;
  receiving an attenuation value change request, which includes an attenuation value to be changed, from the management server; and
  changing an attenuation value of a variable attenuator that is used for attenuating the input signal that is amplified, and that is output to the service side, and that is input to a forward direction signal processor according to an attenuation value change request.

14. The method of claim 13, wherein the attenuation value, when the input signal is an excess input signal, is a value for attenuating the input signal so that intensity of the input signal is equal to that of the reference input signal.

15. A remote management system of a repeater, comprising:
  a repeater that relays each of at least one frequency band signal between a base station and a service side, and that includes at least one variable attenuator that variably attenuates each of at least one frequency band signal that is received from the base station, and that amplifies a signal that is attenuated through the variable attenuator, and that transfers the signal to the service side; and
  a management server that is connected to the repeater through a network to perform communication, and that determines whether at least one frequency band signal that is input to the repeater is an excess input signal, if at least one frequency band signal that is input to the repeater is an excess input signal, and that transfers an attenuation value of the variable attenuator for attenuating the corresponding at least one frequency band signal to the repeater,
  wherein the repeater changes an attenuation value of the variable attenuator according to an attenuation value that is transferred from the management server.

16. The remote management system of claim 15, wherein the repeater comprises:
  a feeder sharer that distributes at least one frequency band signal that is received from the base station according to each frequency band;
  a plurality of variable attenuators, each attenuating a signal that is output from the feeder sharer according to a predetermined attenuation value;
  a plurality of forward direction signal processors, each performing an amplifying and filtering processing and outputting an output signal of each of the plurality of variable attenuators;
  a repeater controller that detects output signal intensity of each of the plurality of forward direction signal processors and that controls an attenuation value of each of the plurality of variable attenuators; and
  a repeater supervisor that transmits each output signal intensity that is detected by the repeater controller to the management server, and that receives an attenuation value change request, which includes an attenuation value to be changed, from the management server, and that transfers the attenuation value change request to the repeater controller,
  wherein the repeater controller changes an attenuation value of each of the plurality of variable attenuators according to an attenuation value that is transferred from the management server through the repeater supervisor.

17. The remote management system of claim 16, wherein the management server comprises:
  an excess input supervisor that periodically requests excess input determination information for determining whether at least one frequency band signal that is transferred from the base station to the repeater is an excess input signal to the repeater supervisor;
  an excess input determination unit for determining whether at least one frequency band signal is an excess input signal based on excess input determination information that is received through the excess input supervisor; and
  an excess input processor that calculates an attenuation value to change for the variable attenuator when at least one frequency band signal is determined as an excess input signal by the excess input determination unit and that transfers the attenuation value to the repeater.

18. The remote management system of claim 17, wherein the excess input determination unit calculates intensity of each of at least one frequency band signal that is transferred from the base station to the repeater using the output signal intensity and the gain value, compares the calculated intensity of each signal and the reference input signal intensity, and that determines, if intensity of the signal exceeds the reference input signal intensity, the at least one frequency band signal as an excess input signal.

19. The remote management system of claim 18, wherein the excess input processor calculates an attenuation value for attenuating intensity of a frequency band signal that is determined as the excess input signal by the reference input signal intensity and transmits an attenuation value change request including the calculated attenuation value to the repeater supervisor.

* * * * *